J. J. WALK.
AUTOMOBILE DRIVING MECHANISM.
APPLICATION FILED MAY 12, 1914.

1,128,922.

Patented Feb. 16, 1915.

WITNESSES:
Charles R. Ickles
Thos Cashberg

INVENTOR
Jasper J. Walk.
BY G. H. Strong.
ATTORNEY

UNITED STATES PATENT OFFICE.

JASPER J. WALK, OF OAKLAND, CALIFORNIA.

AUTOMOBILE DRIVING MECHANISM.

1,128,922.     Specification of Letters Patent.     Patented Feb. 16, 1915.

Application filed May 12, 1914. Serial No. 838,063.

*To all whom it may concern:*

Be it known that I, JASPER J. WALK, a citizen of the United States, residing at Oakland, in the county of Alameda and State of California, have invented new and useful Improvements in Automobile Driving Mechanism, of which the following is a specification.

This invention relates to a front wheel drive.

The object of the invention is to provide a novel form of transmission by which the engine power may be transmitted to drive the front wheels of a motor vehicle, or like device.

Another object of the invention is to provide a front wheel drive which will not interfere with the steering connections on the wheels.

Further objects will hereinafter appear.

The invention consists of the parts and the construction and combination of parts hereinafter more fully described and claimed, having reference to the accompanying drawings, in which—

Figure 1:
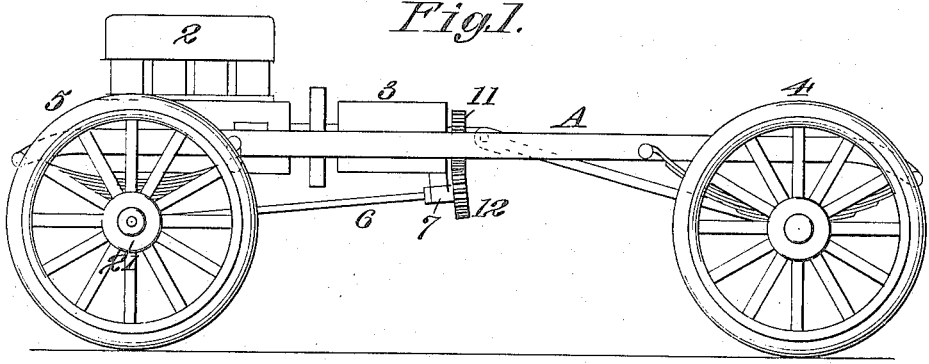
Figure 2:
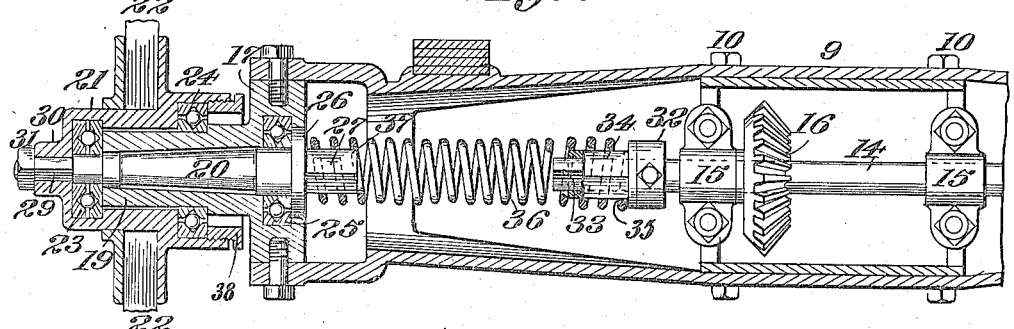
Figure 3:
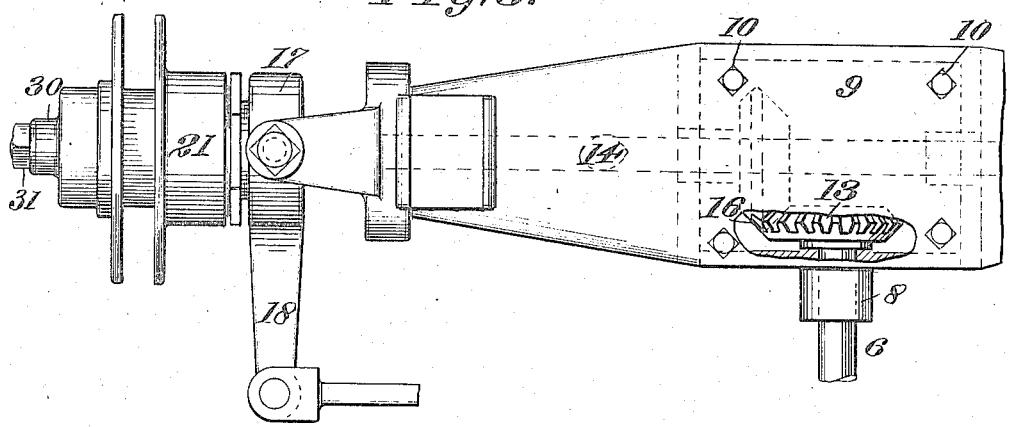

Figure 1 is a side elevation of the chassis, showing the application of the invention. Fig. 2 is a vertical, central section of the front axle and wheel, showing the driving connection. Fig. 3 is a plan view of same.

Referring to the drawings, A indicates the chassis of a motor car; 2 the engine; 3 the transmission case; 4 the rear driving wheels to which power is transmitted in any suitable manner, and 5 the front wheels.

The subject matter of the present invention comprises a secondary transmission through which power is transmitted to the front wheels of the car. This is accomplished in the manner: 6 indicates a secondary drive shaft which is supported at one end by a journal 7 and at the other end by journals 8, formed in a secondary transmission case 9, which is suitably secured as at 10 in the front axle frame of the car. Suitably secured on the main transmission shaft is a spur gear 11, and intermeshing with said gear and secured to the secondary shaft 6 is a second spur gear 12. Secured upon the other end of the shaft 6 within the secondary transmission case 9 is a bevel gear 13, and secured upon an intermediate shaft 14 which is journaled in said case, as at 15, and which is positioned at right angles to shaft 6, is a bevel gear 16. The knuckle indicated at 17 is in this instance, provided with a steering arm extension 18 in the usual manner, and is also provided with a journal extension 19 on the inside of which is mounted a spindle 20. Journaled on the opposite side of the bearing extension is a wheel hub 21 to which spokes 22 and the felly of the wheel are secured. The wheel hub, together with the spindle is preferably mounted in anti-friction bearings, as indicated at 23, 24 and 25; and the inner end of the spindle is provided with an annular shoulder 26 and a square shank 27. The outer end of the spindle is also provided with a square shank extension, as indicated at 29. The reduced end of the wheel hub indicated at 30, is also square to form a driving connection between the spindle and hub, and the spindle, together with the hub, are secured upon the knuckle-bearing extension 19 by means of a nut 31.

Secured on the intermediate shaft 14 is a set-collar 32, and slidably mounted on a feather 33 on said shaft, is a flanged collar 34. Secured on said collar, as at 35, is a coil spring 36, the other end of which is secured, as at 37, to the square shank extension 27 on the spindle. A flexible driving connection between shaft 14 and spindle 20 is thus formed, which permits the wheel to be operated in the usual manner by the steering arm 18; collar 34 permitting the spring to contract and expand as conditions may require.

The operation will be as follows: Power is transmitted through gears 11 and 12 and shaft 6 to bevel gear 13 with which bevel gear 16 intermeshes, and power is consequently transmitted to the intermediate shaft where it is in turn transmitted through coil spring 36 to spindle 20. The square shank extension 28 on the outer end of the spindle forms a driving connection between the spindle and the hub of the wheel. A driving connection direct to the front wheel is thus formed. While I have here only shown and described one front wheel, I wish it understood that the opposite side is similarly connected and constructed.

Nut 31 not only secures the wheel hub upon journal extension 19 but also forms a means by which anti-friction bearings 23—25 may be adjusted. Anti-friction bearing 24 may be independently adjusted by means of screw-sleeve 38.

A front drive constructed and connected as here shown is simple and substantial in construction, and does not interfere with the knuckle and steering arm connections of the wheels. Any desired curve may be encountered without straining the flexible connection 36 in any manner, as this may contract or expand by reason of sliding collar 33. The position of the anti-friction bearings within the wheels produces a well-balanced construction, in which all thrusts and strains are equally compensated. The flexible connection, indicated at 36, is preferably constructed of a square spring; and may be double in construction if desired; but the materials and finish of the several parts of the drive may otherwise be such as the experience and judgment of the manufacturer may dictate.

I wish it understood that various changes in form, proportion and minor details of construction may be resorted to within the scope of the appended claim, and that I do not wish to limit myself to the specific design and construction here shown.

Having thus described my invention, what I claim and desire to secure by Letters Patent is:

The combination with a driving member and a driven member of a collar having an end flange, said collar being slidably mounted adjacent one end of the driving member, a set collar adjustably mounted on the driving member, means for holding the set collar in adjusted positions on the driving member, and a coil spring having one end fixed to the driven member and its other end surrounding the slidable collar, said slidable collar being adapted to slide upon the driving member and the flange being adapted to engage the set collar to limit movement in one direction.

In testimony whereof I have hereunto set my hand in the presence of two subscribing witnesses.

JASPER J. WALK.

Witnesses:
 JOHN H. HERRING,
 W. W. HEALEY.